US011556673B2

(12) United States Patent
Phan et al.

(10) Patent No.: US 11,556,673 B2
(45) Date of Patent: Jan. 17, 2023

(54) METHOD FOR MANAGING AN INSTANCE OF A CLASS

(71) Applicant: THALES DIS FRANCE SAS, Meudon (FR)

(72) Inventors: Guillaume Chi-Dan Phan, Gemenos (FR); Xavier Minette De Saint Martin, Gemenos (FR); Nicolas Vienne, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 143 days.

(21) Appl. No.: 16/621,781

(22) PCT Filed: May 14, 2018

(86) PCT No.: PCT/EP2018/062414
§ 371 (c)(1),
(2) Date: Dec. 12, 2019

(87) PCT Pub. No.: WO2018/228763
PCT Pub. Date: Dec. 20, 2018

(65) Prior Publication Data
US 2020/0151365 A1 May 14, 2020

(30) Foreign Application Priority Data
Jun. 15, 2017 (EP) .................................... 17305731

(51) Int. Cl.
*G06F 21/71* (2013.01)
*G06F 21/12* (2013.01)
*G06F 21/77* (2013.01)

(52) U.S. Cl.
CPC .............. *G06F 21/71* (2013.01); *G06F 21/12* (2013.01); *G06F 21/77* (2013.01); *G06F 2221/0797* (2013.01)

(58) Field of Classification Search
CPC .............. G06Q 20/3552; G06Q 20/341; G06F 9/44521; G06F 9/44589; G06F 9/445;
(Continued)

(56) References Cited

U.S. PATENT DOCUMENTS 9,159,063 B1 * 10/2015 McDonald ............ H04W 12/04
10,409,588 B2 * 9/2019 Franchi ................. G06F 9/4451
(Continued)

FOREIGN PATENT DOCUMENTS

EP         1936574     *   6/2008 ............. G06F 9/445
EP         1936574 A1     6/2008
(Continued)

OTHER PUBLICATIONS

International Search Report (PCT/ISA/210) dated Jul. 19, 2018, by the European Patent Office as the International Searching Authority for International Application No. PCT/EP2018/062414.
(Continued)

*Primary Examiner* — Tae K Kim
(74) *Attorney, Agent, or Firm* — Adam Lewental; Thales Dis CPL USA, Inc

(57) ABSTRACT

The invention is a method for managing an instance of a class in a secure element embedded in a hosting machine and including a Central Processing Unit, a storage area and a virtual machine. The method comprises a step of receiving by the secure element a load file containing a binary representation of a package of the class and a step of instantiating the instance from the package and storing the instance in the storage area. The load file includes a specific component which is a custom component within the meaning of Java Card™ specifications and which contains executable data. The instance requests the execution of a subset of the executable data by directly invoking the subset of executable data through an Application Programming Interface.

12 Claims, 9 Drawing Sheets

(58) Field of Classification Search
CPC ............. G06F 9/45504; G06F 9/45508; G06F 9/4552; G06F 9/45516; G06F 21/55; G06F 21/71; G06F 21/77; G06F 21/12
See application file for complete search history.

(56) References Cited

U.S. PATENT DOCUMENTS

| | | | | |
|---|---|---|---|---|
| 2010/0077392 | A1* | 3/2010 | Soh | G07F 7/1008 717/174 |
| 2011/0126183 | A1* | 5/2011 | Bernard | G06Q 20/3552 717/168 |
| 2012/0130838 | A1* | 5/2012 | Koh | G06Q 20/3672 705/26.1 |
| 2012/0190354 | A1* | 7/2012 | Merrien | G06F 8/61 455/422.1 |
| 2012/0216276 | A1* | 8/2012 | Regnault | G06Q 20/3574 726/16 |
| 2012/0259822 | A1* | 10/2012 | Medgyesi | G06F 9/44557 707/693 |
| 2013/0227646 | A1* | 8/2013 | Haggerty | H04W 12/06 726/3 |
| 2015/0193221 | A1* | 7/2015 | Khan | H04W 4/60 713/176 |
| 2017/0270517 | A1* | 9/2017 | Vasu | G06Q 20/3674 |
| 2018/0060043 | A1* | 3/2018 | Ahmad | G06F 8/54 |
| 2018/0082293 | A1* | 3/2018 | Lin | G06Q 20/38215 |
| 2018/0203853 | A1* | 7/2018 | Ajila | G06F 9/4484 |

FOREIGN PATENT DOCUMENTS

| | | | | |
|---|---|---|---|---|
| EP | 2469486 | * | 6/2012 | ............... G06F 7/10 |
| EP | 2469486 | A1 | 6/2012 | |
| WO | 2008068576 | A1 | 6/2008 | |
| WO | 2015078614 | A1 | 6/2015 | |
| WO | 2015102944 | A1 | 7/2015 | |

OTHER PUBLICATIONS

Written Opinion (PCT/ISA/237) dated Jul. 19, 2018, by the European Patent Office as the International Searching Authority for International Application No. PCT/EP2018/062414.

* cited by examiner

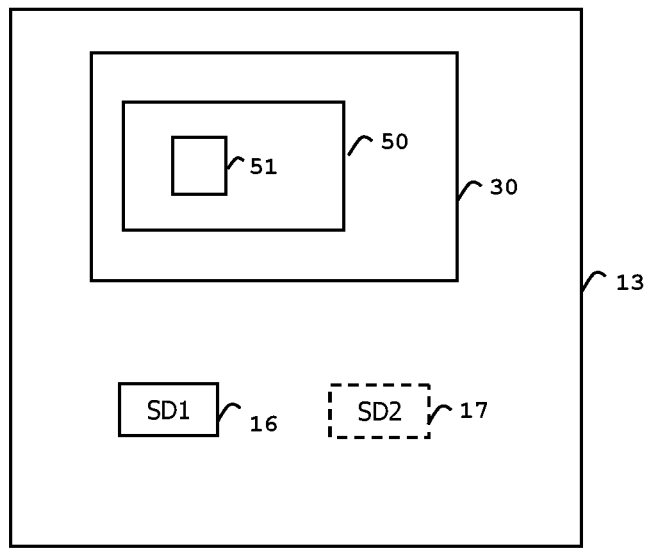
FIG. 3
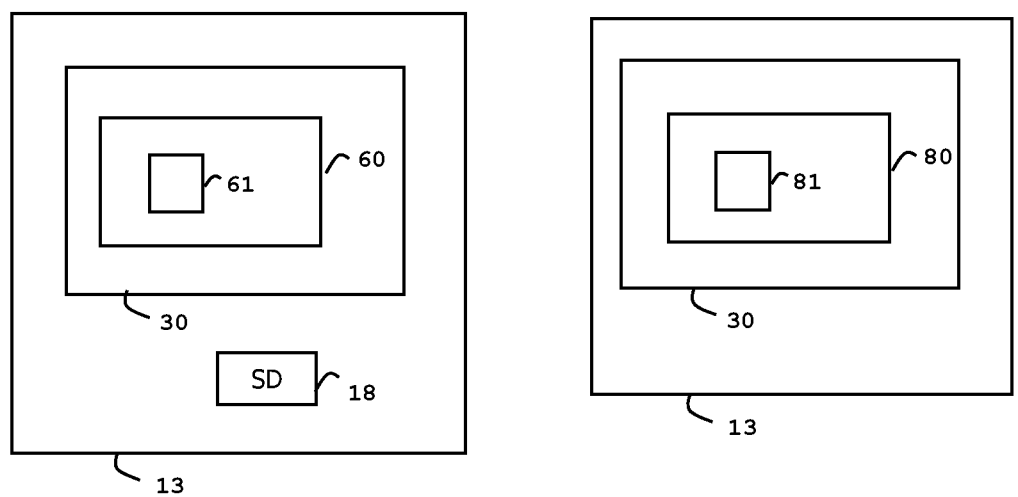
FIG. 4
FIG. 6

METHOD FOR MANAGING AN INSTANCE OF A CLASS

FIELD OF THE INVENTION

The present invention relates to methods of managing an instance of a class. It relates particularly to methods of managing instance of a class defined by a package in a secure element.

BACKGROUND OF THE INVENTION

Secure elements can be small devices comprising a memory, a microprocessor and an operating system for computing treatments. Such secure elements may comprise a plurality of memories of different types, like non-volatile memory and volatile memory. They are called "secure" because they are able to control the access to the data they contain and to authorize or not the use of data by other machines or entities. Secure elements may also provide computation services based on cryptographic components. In general, secure elements have limited computing resources and limited memory resources and they are intended to be connected to a host machine which provides them with electric power. Secure elements may be removable or fixed to a host machine. For example, smart cards, embedded secure element (eSE) and integrated secure element (iSE) are a kind of secure elements.

An application intended to be installed on a secure element may be developed as a class or a set of classes which is stored into the secure element. Typically a Java Card™ applet can be handled through several classes defined in one or several packages. Such applet is installed by creating an instance of each of its associated classes. Such applet may need to be personalized with diversified data specific to the context of operation and/or to the end-user. The executable code relating to such personalization phase is part of the applet executable code. This increase the overall size of the applet executable code which must remain stored in the secure element during all the applet life. Moreover, commands which need to be executed for running the executable code relating to such personalization operation is typically bound to the I/O interface on which these commands are transported. (e.g. to APDU defined by ISO-7816 standards in the case of smart cards). This makes uneasy or impossible to issue such commands if any of the I/O interface protocols changes.

The document WO2008/068576 A1 describes a way to use custom components of a CAP file for conveying static personalization data of a Java Card™ application.

The document WO2015/078614 A1 describes a way to use custom components of a CAP file for loading patch written in native code.

There is a need to improve management of instance of class, and especially there is a need to make more flexible how to handle executable code relating to personalization operation of an instance of a class in a secure element.

SUMMARY OF THE INVENTION

An object of the invention is to solve the one of the above mentioned technical problem.

An aspect of the present invention is a method for managing an instance of a class in a secure element embedded in a hosting machine. The secure element includes a Central Processing Unit, a storage area and a virtual machine. The method comprises a step of receiving by the secure element a load file containing a binary representation of a package of the class and a step of instantiating the instance from the package and storing the instance in the storage area. The load file includes a specific component which is a custom component within the meaning of Java Card™ specifications. The specific component contains executable data and the instance requests the execution of a subset of said executable data by directly invoking the subset of executable data through an Application Programming Interface (API).

Advantageously, the execution of said subset of executable data may personalize the instance.

Advantageously, the specific component may contain Heap data and said Heap data may be written in a heap of the virtual machine to personalize the instance.

Advantageously, the load file may include a Setup component containing an installation parameter which triggers an automatic installation of the instance, the Setup component being a custom component within the meaning of Java Card™ specifications.

Advantageously, the installation parameter may trigger at least one of the following actions: an automatic installation of the instance, an automatic association of the instance to a security domain and an automatic creation of a security domain.

Advantageously, the load file may include a Security Domain component containing Security Domain parameters which are required to securely initialize a Security Domain to which the package is associated, said Security Domain component being a custom component within the meaning of Java Card™ specifications.

Advantageously, the load file may include a Group component containing a group parameter which defines a group of packages sharing at least one security attribute, said package belonging to said group of packages and said Group component being a custom component within the meaning of Java Card™ specifications.

Advantageously, said at least one security attribute may be a Firewall Context ID.

Advantageously, the load file may include a Security component containing a security parameter which is required to verify the genuineness of the package or to decipher part of the load file, said Security component being a custom component within the meaning of Java Card™ specifications.

Another aspect of the invention is a method for generating a load file to be loaded on a secure element comprising a virtual machine, a CPU and a storage area. The load file contains a binary representation of a package of a class. The method comprises the following steps:

generating an executable data to be directly invoked through an Application Programming Interface (API) by an instance of said class instantiated from said package and stored in the storage area, generating a specific component containing said executable data, said specific component being a custom component within the meaning of Java Card™ specifications, and including the specific component in the load file.

Another aspect of the invention is a secure element embedded in a hosting machine and including an Operating System, a CPU, a storage area, a virtual machine, a loader and a linker. The secure element is able to receive a load file containing a binary representation of a package of a class and to create an instance of the class from said package. The loader is adapted to retrieve from the load file and to handle a specific component which is a custom component within the meaning of Java Card™ specifications and which comprises executable data to be directly invoked through an Application Programming Interface (API) by the instance of the class. The linker is adapted to perform a linking phase of the executable data contained in the specific component.

Advantageously, the loader may be configured to personalize said instance by automatically running a subset of executable data.

Advantageously, the load file may include a Setup component containing an installation parameter which triggers an automatic installation of said instance by the loader, said Setup component being a custom component within the meaning of Java Card™ specifications.

Advantageously, the load file may include a Security Domain component containing Security Domain parameters which are used by the loader to securely initialize a Security Domain to which the package is associated, said Security Domain component being a custom component within the meaning of Java Card™ specifications.

Advantageously, the load file may include a Security component containing a security parameter which is used by the loader to verify the genuineness of the package or to decipher part of the load file, said Security component being a custom component within the meaning of Java Card™ specifications.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which:

FIGS. 3 to 6 depict schematically configurations of the storage area of a secure element according to several examples of the invention.

DETAILED DESCRIPTION OF THE PREFERRED EMBODIMENTS

The invention may apply to any type of application intended to be installed on a secure element through package mechanism. The invention is well suited for secure elements comprising a virtual machine like a Javacard® virtual machine for example.

Such secure elements may be coupled to a host machine like a smartphone, a tablet, a personal computer, a smart watch, a vehicle, a meter, a slot machine, a TV or a computer for example.

In the present description, the word package means a set of individual files, data or resources which are packed together as a software collection that provides certain features or services. For instance a package may contain executable code and static parameters.

The invention applies to packages as defined in object-oriented programming languages (like Java® for instance).

Figure 2:
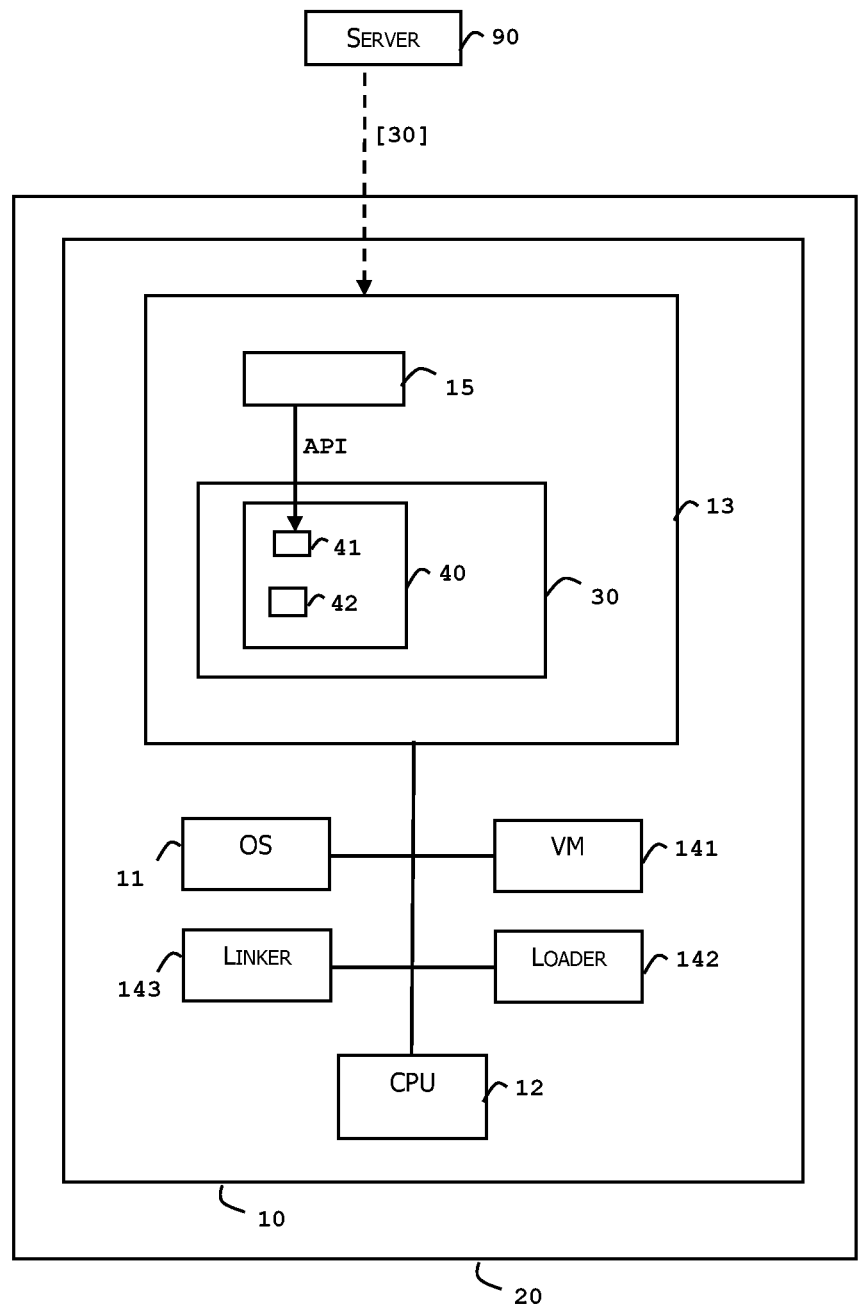
FIG. 2 depicts schematically an architecture of a system including a secure element and a server according to an example of the invention.

FIG. 2 shows schematically the architecture of a system including a secure element and a server according to an example of the invention.

In this embodiment, the secure element 10 is a eUICC (embedded Universal Integrated Circuit Card) embedded in a hosting machine 20. The hosting machine 20 can be a mobile phone for example.

A server 90 is supposed to send a load file 30 to the secure element 10. For instance, the load file can be conveyed through OTA (Over-The-air) using Telecom communication protocols (i.e. remote connection) or via a local connection.

The secure element 10 includes a central processing unit (CPU) 12, an operating system (OS) 11, a Java Card virtual machine (VM) 141, a loader 142, a linker 143 and a storage area 13. The storage area 13 can comprise a volatile part and a non-volatile part. The load file 30 is stored into the storage area 13.

The load file 30 comprises a binary representation of a package of a class. Preferably, the load file 30 is a CAP file. A Java Card CAP file is composed of a number of standardized Components. The Java Card Specifications also allows the CAP file to host so-called custom components whose contents and semantic are not defined by and remain out of scope of the Java Card Specifications.

An instance 15 of the class has been created and is stored in the storage area 13. The load file 30 includes a specific component 40 which is a custom component. The specific component 40 comprises executable data 41. In this example, the specific component 40 also comprises heap data 42. (Optional)

Figure 1:
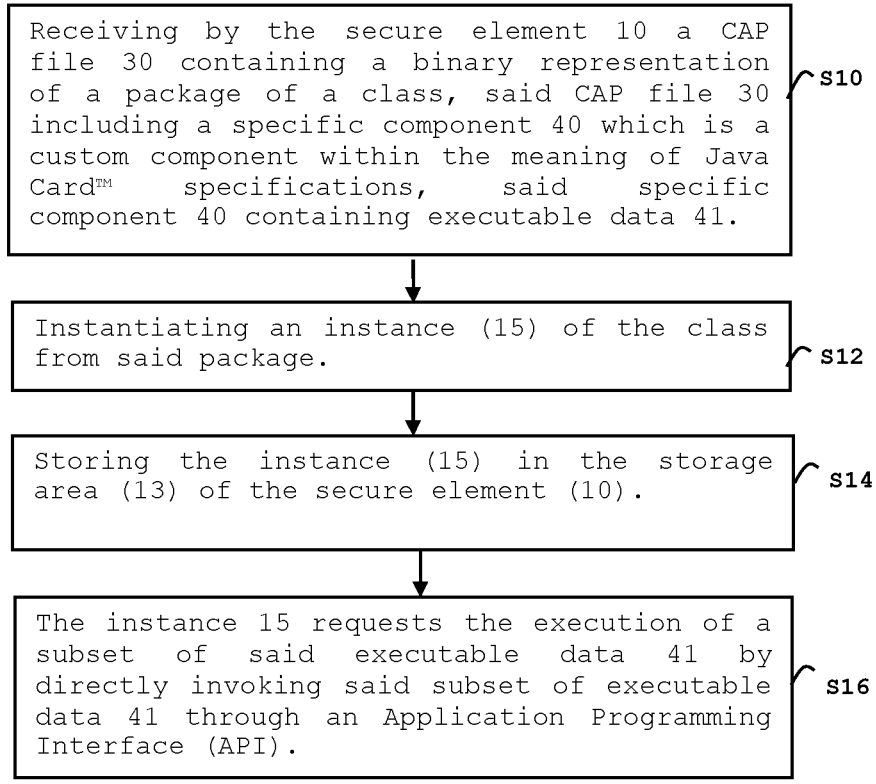
FIG. 1 show a flow diagram of instance management according to an example of the invention.

FIG. 1 shows an example of flow diagram of instance management according to an aspect of the invention.

At step S10, the secure element 10 (similar to that presented at FIG. 2) receives a load file 30 which contains a binary representation of a package of a class. Preferably the load file can be a CAP file as defined by Java Card™ specifications V2.1. or upper. The CAP file 30 includes a specific component 40 which is a custom component within the meaning of Java Card™ specifications V2.1. The specific component 40 contains executable data 41. Preferably, the executable data 41 are bytecode runnable by a Java Virtual machine embedded in the secure element 10.

At step S12, an instance 15 of the class is created from the package. This operation is called instantiation of the class.

Then at step S14, the created instance 15 is stored in a storage area 13 of the secure element 10.

At step S16, the instance 15 requests the execution of a subset of the executable data 41 by directly invoking the subset of executable data 41 through an Application Programming Interface (API). Hence, at least a part of the executable data 41 is executed under the control of the instance 15. In other words, the instance 15 is designed to call the relevant API to trigger execution of executable data 41.

Hence execution of the executable data 41 can allow to update cardholder specific data, to generate random values, secret keys or cryptograms to be sent after personalization phase.

According to one aspect of the invention, executable data 41 contain a software component which is designed to personalize the instance 15 itself. Thus the instance can initiate its own personalization operation by calling the executable data 41 (or a subset) on its own. In this case, the specific component 40 (i.e. custom component) is named Perso component (PEC).

In one embodiment, the custom component 41 can also contain Heap data which are intended to be written in the heap of the virtual machine of the secure element 10 to personalize the instance 15.

In a further embodiment, the Perso Component (PEC) contains executable code suitable for personalizing one or more Applet instances. Such executable code comes in addition to, is provided in the same format (i.e. Java Card bytecodes), and needs to be linked in the same way as the executable code present in the standard Method component which constitutes the main executable code of the package. From this perspective, the format of executable code contained by the PEC is interoperable and may be interpreted by any secure element implementation compliant with the Java Card Specifications. Alternatively, the PEC may contain executable code in an alternative proprietary format, or proprietary instructions or macros allowing to perform various personalization operations.

In a variant of the invention, the executable data 41 is intended for the personalization of one or several instances of the same Applet module. In this case, the PEC can contain the identifier (AID) of the Applet module for which such executable data 41 applies. Several Applet modules may be defined in a package. The PEC may contain several sub-components, each one containing executable code for the personalization of a specific Applet module defined in the package. In the following, such a sub-component will be referred to as a sub-component of type A.

In a variant of the invention, the executable data 41 is intended for the personalization of a single Applet instance. In this case, the PEC contains the identifier (AID) of the Applet instance for which the executable data 41 applies. The PEC may contain several sub-components, each one containing executable code for the personalization of a specific Applet instance. In the following, such a sub-component will be referred to as a sub-component of type B.

In a variant of the invention, a sub-component of type B may also contain information (e.g. module AID, instance AID, install parameters, etc.) relating to the automatic installation of an Applet instance. In this case, such an Applet instance shall be installed immediately upon successful linking of the package and the executable code contained by that sub-component may be executed immediately on behalf and in the context of the newly created Applet instance.

In a variant of the invention, a sub-component of type C is introduced which is a variant of sub-component type B also intended for the personalization of a single Applet instance. This sub-component contains the identifier (AID) of the Applet instance to which it applies and references the executable code of a sub-component of type A that shall be executed on behalf and in the context of the specified Applet instance. In this case, the sub-component may also specify input data/parameters which may be accessed during the execution of the referenced executable code.

In a variant of the invention, a sub-component of type C may also contain information (e.g. module AID, instance AID, install parameters, etc.) relating to the automatic installation of an Applet instance. In this case, such an Applet instance shall be installed immediately upon successful linking of the package and the executable code referenced by that sub-component may be executed immediately on behalf and in the context of the newly created Applet instance.

According to an aspect of the invention, an Applet instance running the main executable code of its Method component can invoke a specific Application Programming Interface (API) to run the executable code of the PEC. More precisely the applet instance can invoke the API to run the executable code found in a sub-component of type A corresponding to the Applet module from which this Applet instance was created, or a sub-component of type B or C corresponding to this Applet instance (as specified by its AID). When invoking such an API, the Applet instance may also provide some parameters, e.g. a byte array with input data, which may be accessed during the execution of the referenced executable code.

In a variant of the invention, a sub-component of type B or C may be automatically discarded/deleted once its contents have been used (i.e. once its executable code has been executed). Other conditions may be defined to automatically trigger such an operation. For example, a sub-component of type A may be automatically discarded if all sub-components of type C have been processed. For example, the entire PEC may be automatically discarded once the secure element has processed/gone through all of its sub-components. In another variant, an Applet instance may invoke a specific API to discard/remove a sub-component of type A, B or C.

Java Card objects created by an Applet instance (running its executable code) are stored on the secure element 10 in a so-called HEAP, which is a memory area where Java Card objects are stored in a final and proprietary (implementation specific) format. Therefore, instead of executable code, the PEC may alternatively contain data directly corresponding to the HEAP data that would have resulted from the execution of executable code by the Applet instance. Such data may be provided in final proprietary format if the entity preparing the PEC has a total knowledge of the current internal state of the secure element 10, or in "pre-linked" proprietary format so as to be easily integrated/relocated in the HEAP and associated to the specified Applet instance.

In a variant of the invention, a sub-component of type D is introduced which is similar to a sub-component of type B except that, instead of executable code, it contains "pre-linked" HEAP data provided in a proprietary format. Such data correspond to the HEAP data that would have resulted from the execution of executable code by an Applet instance. The AID of the Applet instance to which such data applies is also specified. However, such data cannot be copied to the HEAP directly and must be first linked/adapted by the secure element 10, e.g. so as to compute their correct final location in the HEAP and correctly associate them with the specified Applet instance. Once they have been linked/adapted, the data can be copied to the HEAP at the computed location.

In a variant of the invention, a sub-component of type D may also contain information (e.g. module AID, instance AID, install parameters, etc.) relating to the automatic installation of an Applet instance. In this case, such an Applet instance may be installed immediately upon successful linking of the package and the data contained by this sub-component may be linked/adapted and copied to the HEAP. A sub-component of type D may be automatically discarded/deleted once its contents have been used (i.e. data linked/adapted/copied to the HEAP). Other conditions may be defined to automatically trigger such an operation. In another variant, an Applet instance may invoke a specific API to discard/remove a sub-component of type D.

In a variant of the invention, a sub-component of type E is introduced which is similar to a sub-component of type D except that, instead of "pre-linked" data, it contains data in a proprietary format directly corresponding to the HEAP data that would have resulted from the execution of executable code by one or several Applet instances. Unlike sub-component of type D, these data are not necessarily bound to a specific Applet instance but correspond to raw HEAP data that may correspond to multiple Applet instances. Hence, such data may be directly copied to the HEAP. A sub-component of this type should be automatically discarded/deleted once its contents have been used (i.e. data copied to the HEAP).

The PEC may combine and contain several occurrences of sub-components of the different types described above.

Figure 7:
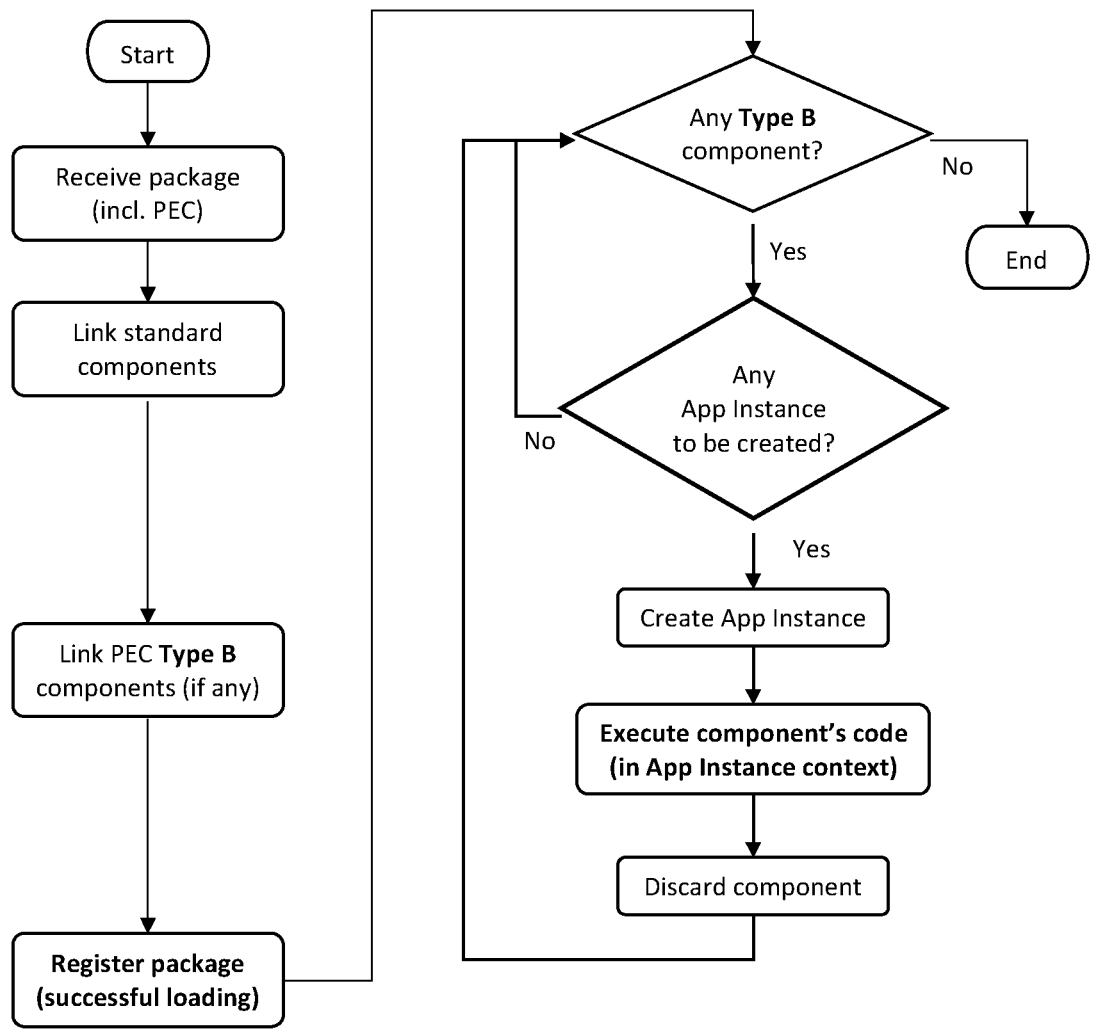
FIG. 7 shows an example of flow diagram of processing a package including a Perso component PEC with type B sub-components.

FIG. 7 shows an example of flow diagram of processing a package including a PEC with type B sub-components.

Figure 8:
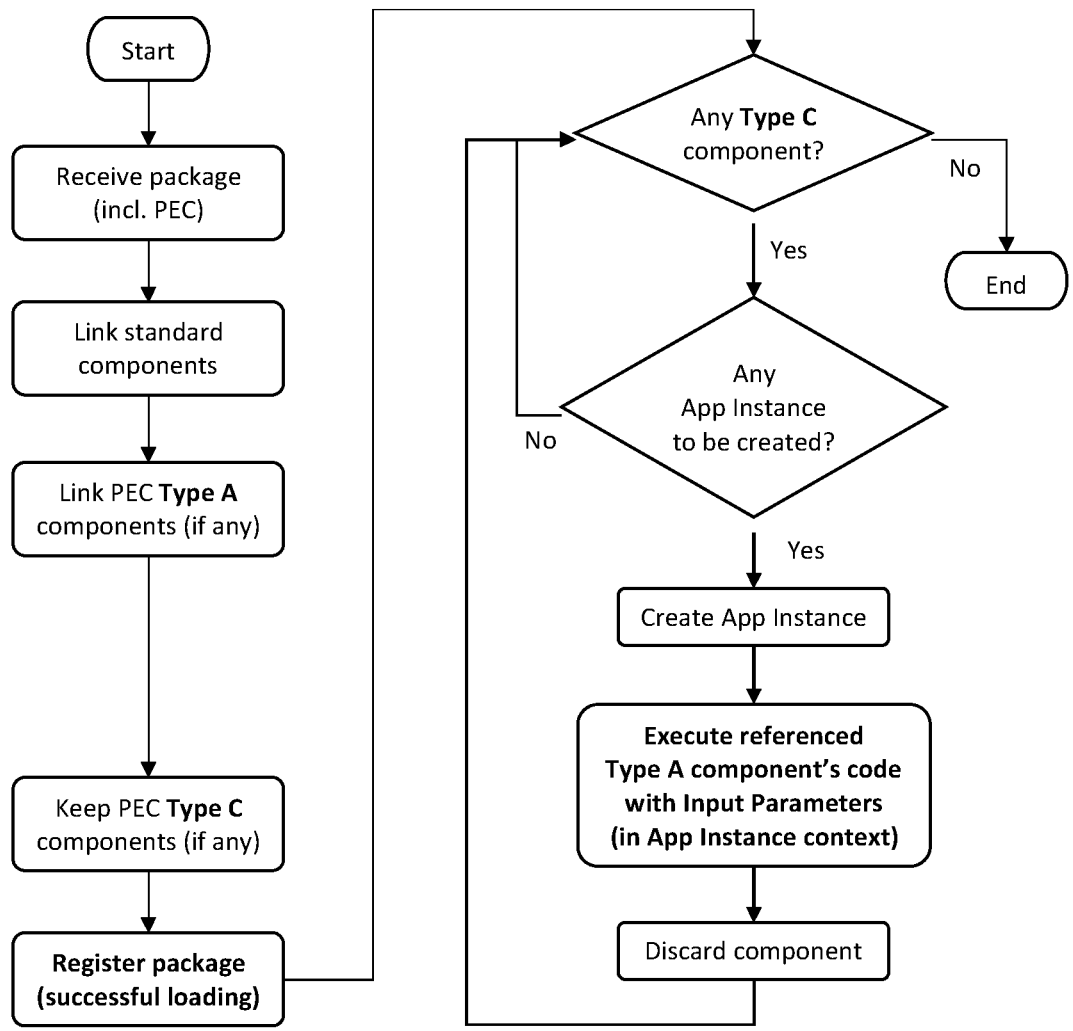
FIG. 8 shows an example of flow diagram of processing a package including a Perso component PEC with type A and C sub-components.

FIG. 8 shows an example of flow diagram of processing a package including a PEC with type A and C sub-components.

Here is an example of runtime behavior upon package loading:
1. Reception of package binary data
2. Upon reception of the last mandatory standard component (as defined by Java Card Specifications), proceed with the linking of the executable code and register the package in the "Package Registry" of the secure element.
3. Upon reception of the Perso component (PEC), process sub-components in their order of appearance:
   a. For each sub-component of type A that is found:
      i. Link the executable code of this sub-component.
      ii. Keep it for later and go to next sub-component.
   b. For each sub-component of type B that is found:
      i. Link the executable code of this sub-component.
      ii. Create the specified Applet instance (from specified data: module AID, instance AID, parameters, etc.). This operation involves invoking the install( ) method of the Applet module, which should eventually result in the creation and the registration of the new Applet instance.
      iii. Run the executable code in the context of the newly created Applet instance.
      iv. Discard this sub-component (of type B).
   c. For each sub-component of type C that is found:
      i. Create the specified Applet instance (from specified data: module AID, instance AID, parameters, etc.). This operation involves invoking the install( ) method of the Applet module, which should eventually result in the creation and the registration of the new Applet instance.
      ii. Locate the referenced sub-component of type A, check that it can be used by the new Applet instance (e.g. the AID specified in this sub-component shall match the module AID of the Applet instance) and get ready to run its executable code.
      iii. Prepare the specified input parameters so that they can be accessed when running the executable code.
      iv. Run the executable code in the context of the newly created Applet instance.
      v. Discard this sub-component (of type C).
   d. For each sub-component of type D that is found:
      i. Create the specified Applet instance (from specified data: module AID, instance AID, parameters, etc.). This operation involves invoking the install( ) method of the Applet module, which should eventually result in the creation and the registration of the new Applet instance.
      ii. Link/adapt the data and associate them to the new Applet instance.
      iii. Copy the finalized data to the HEAP.
   e. For each sub-component of type E that is found:
      Copy the (already linked and final) data to the HEAP In the above example, the entire PEC may be deleted at the end of the processing, or alternatively sub-components of type A may be kept so as to be later invoked (using an API) by additional Applet instances created independently.

Using the abovementioned API, an Applet instance could request executing and/or getting rid of a sub-component's executable code any time during its lifetime. Some sub-components may become useful/useless depending on the configuration achieved during earlier phases. E.g. a sub-component could be dedicated to executable code implementing symmetric cryptography whereas another would be dedicated to asymmetric cryptography: one of them would become useless depending on the cryptographic keys personalized earlier.

Thanks to an aspect of the invention, an Application Provider can easily define suitable configuration(s) for its Application(s) and embed such information directly in the Java Card CAP file. Hence, only a single operation (i.e. loading the package) is needed to achieve the full installation and personalization of one or several Applet instances, avoiding additional management step or further authorization.

An aspect of the invention allows separating personalization-related executable code from the rest of the executable code (i.e. focused on the operational phase) which can then be smaller. The personalization-related executable code may be deleted so as to reclaim memory space (immediately or later).

An aspect of the invention allows deploying suitable configuration(s) easily whatever the communication channel and messaging used for transport (e.g. APDU, SPI, I2C, HCI, OTA), with no need to rework the messaging to deploy the contents.

The invention is well-suited for the broadcast or scaled deployment of contents to a very large number of IOT/wearable-hosted Java Card based Secure Elements.

Thanks to an aspect of the invention, security is improved. Moreover it simplifies the certification of Applets, as the personalization executable code is isolated and can be fully removed before operational phase.

It is to be noted that if not supported by a Java Card platform, the PEC will simply be ignored (NB: property of custom components as defined by Java Card specifications). An Application Provider can build/maintain a package including a PEC and still load it to any secure element. The invention remains compatible with already deployed secure elements.

It is to be noted that the invention does not need to upgrade the virtual machine (i.e. no design impact on the Java Card VM).

FIG. 3 shows schematically the configuration of a storage area 13 of a secure element according to an example of the invention.

In this embodiment, the storage area 13 stores a load file 30 which includes a Setup component 50 also named SUC. The Setup component 50 contains an installation parameter 51 which triggers an automatic installation of the instance 15 (by reference to FIGS. 1 & 2). The Setup component 50 is a custom component within the meaning of Java Card™ specifications V2.1. In the example of FIG. 3, the storage area 13 stores a security domain 16 (named SD1) as defined by GlobalPlatform specifications V2.1 or upper.

The installation parameter 51 can trigger one or several of the following actions: the automatic installation of the instance 15, the automatic association of the instance 15 to the security domain 16 and the automatic creation of a security domain 17. (shown in dashed line with the name SD2 at FIG. 3.)

In a further embodiment, the Setup component (SUC) describes additional setup actions that shall be performed upon successful loading/linking of the executable code contained by the package. This component may include information related to:
- Creation of one or several Applet instances, from one or several of the Applets defined in the package. Installation parameters and other meta-data (to be used depending on the features supported by the secure element) may be provided for each Applet instances,
- Creation of one or several Security Domains,
- Association of the package to a Security Domain present on the secure element. For security reasons, this association may be limited to Security Domains created during the loading of this package,
- Association of the Applet instances to various Security Domains present on the secure element. An Applet instance may only be associated to a single Security Domain. Several Applet instances may be associated to the same Security Domain. For security reasons, associations may be limited to Security Domains created during the loading of this package,
- Flag A: indicates whether the package should be kept on the secure element even if some actions described in the Setup component could not be successfully completed (e.g. only half of the specified Applet instances can been installed due to a lack of memory resources, etc.), or on the contrary whether it should be deleted,
- Flag B: indicates whether the Applet instances and Security Domains previously created should be kept on the secure element even if some of the actions described in the Setup component could not be successfully completed (e.g. only half of the specified Applet instances can been installed due to a lack of memory resources, etc.), or on the contrary whether all of them shall be deleted.

Here is an example of runtime behavior upon package loading:
1) Reception of package binary data
2) Upon reception of the last mandatory standard component (as defined by Java Card Specifications), proceed with the linking of the executable code and register the package in the "Package Registry" of the secure element. If an error is detected the entire procedure is aborted. Otherwise, depending on Flag A described above, the successful loading of the package may be recorded or it may still be pending.
3) Upon reception of the Setup component:
   a. If specified, create the Security Domains (one or more) described in this component, with specified AIDs.
   b. Create the Applet instances described in this component, with specified AIDs. Use the installation parameters and other meta-data provided for each Applet instance.
   c. If specified, associate the package to the specified Security Domain (which shall be one of the Security Domains previously created). If no association is specified, the package shall be associated to a Security Domain according to the rules define in the GlobalPlatform Card Specification (not specified in this component), or potentially according to other rules.
   d. For each Applet instance previously created, associate the Applet instance to the specified Security Domain (which shall be one of the Security Domains previously created). If no association is specified for an Applet instance, the Applet instance shall be associated to a Security Domain according to the rules define in the GlobalPlatform Card Specification (not specified in this component), or potentially according to other rules.
   e. If no error occurred in previous steps, record the successful loading of the package. Otherwise,
      i. If Flag B specifies that that in case of failure the Applet instances and/or Security Domains shall be deleted, then proceed with the deletion of these elements.

Figure 9:
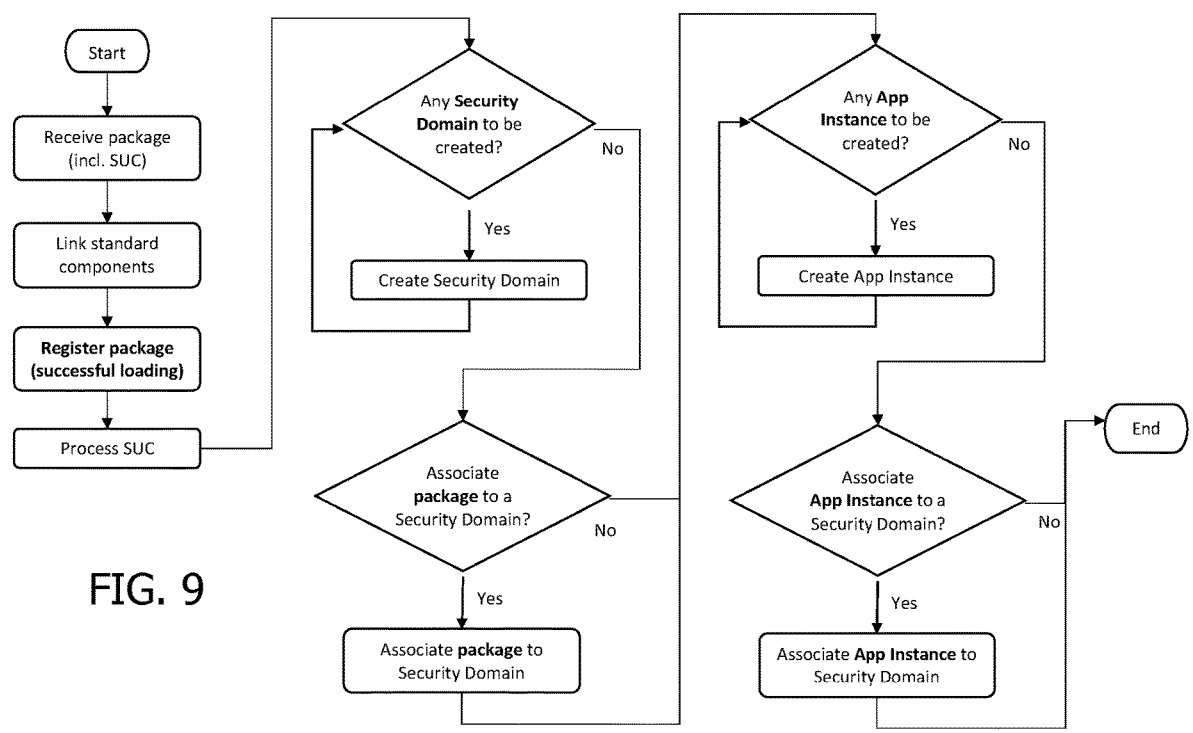
FIG. 9 shows an example of flow diagram of processing a package including a Setup component.

If Flag A specifies that in case of failure the package shall be deleted, proceed with the deletion of the package. Otherwise, record the successful loading of the package FIG. 9 shows an example of flow diagram of processing a package including a Setup component SUC.

An aspect of the invention allows the Application Provider to easily define and deploy a configuration composed of one or several Applet instances and to embed such information directly in the Java Card CAP file.

Thanks to an aspect of the invention, only a single operation (i.e. loading the package) is needed to achieve the full installation of one or several Applet instances, while usually such a configuration can only be achieved in several separate management steps, authorizations, etc which imply sending of several commands from the server to the secure element. If the deployment requires cryptographic authorizations, then only a single authorization can be managed for the entire deployment and verified when loading the package.

FIG. 4 shows schematically the configuration of a storage area 13 of a secure element according to an example of the invention.

In this embodiment, the storage area 13 stores a load file 30 which includes a Security Domain component 60 also named SDC. The SDC 60 contains Security Domain parameters 61 which are required to securely initialize a Security Domain 18 to which the package is associated. The Security Domain component 60 is a custom component within the meaning of Java Card™ specifications. In the example of FIG. 4, the storage area 13 stores a security domain 18 (named SD) as defined by Global Platform specifications.

In the following part, the security scheme makes use of asymmetric cryptography and key pairs composed of a public key (PK) and its associated private key (SK). A public key can sometimes be provided under the form of a public key certificate (CERT) delivered by some certificate authority: in this case, the public key needs to be extracted from the certificate, and this should be done only after verification of the certificate.

In one embodiment, an Application Provider (AP) may load its Java Card package to a secure element and doing so, automatically install a new Security Domain (SD) to which the package will be associated, generate cryptographic keys for this Security Domain and retrieve such cryptographic keys off-secure element.

The secure element is supposed to have been prepared as follows:

The secure element shall contain one or several sets of credentials whose purpose is to protect the cryptographic keys generated for the newly created Security Domain. Typically, the Card Issuer or the Card Manufacturer may set up such a set of credentials, or one or several Controlling Authorities (CA) may have their sets of credentials stored on the secure element. In the following the term CA refers to either the Card Issuer, Card Manufacturer or one of the CAs.

Each set of credentials shall be associated with a CA Identifier that may later be used to find it.

Each set of credentials shall be composed of:
  CA Private Key for Signature Generation (SK.CA.AUT)
  [Optional] CA Public Key Certificate for Signature Verification (CERT.CA.AUT)
  If EC cryptography is used:
    CA Private Key for Key Agreement (SK.CA.ECKA)
    [Optional] CA Public Key Certificate for Key Agreement (CERT.CA.ECKA)
  If RSA cryptography is used:
    CA Private Key for Decryption (SK.CA.ENC)

The Security Domain component (SDC) contains:
[Optional] CA Identifier allowing to look for and retrieve a suitable set of credentials within the secure element. If none is specified, the secure element may try to use a default set of credentials (if any is present on the secure element).
[Mandatory] Key Protection Block which will allow recovering the symmetric encryption/decryption key KS.KEY.ENC that shall be used to encrypt the cryptographic keys generated for the newly created Security Domain.
  If EC cryptography is used then SK.CA.ECKA is expected to be present in the identified set of credentials and the Key Protection Block shall consist of the ephemeral public key ePK generated by the AP.
  If RSA cryptography is used then the Key Protection Block shall consist of the encrypted KS.KEY.ENC. In this scenario, KS.KEY.ENC shall be encrypted by the AP using PK.CA.ENC and it is assumed that PK.CA.ENC is either publicly available (under the form of a certificate CERT.CA.ENC from which PK.CA.ENC may be extracted) or that it was somehow provided to AP by the CA.
[Mandatory] AID (Application ID) of the new Security Domain that shall be created.
[Mandatory] Installation parameters and other meta-data that shall be used to create the new Security Domain.

Here is an example of runtime behavior upon package loading:
1. Reception of package binary data
2. Upon reception of the last mandatory standard component (as defined by Java Card Specifications), proceed with the linking of the executable code and register the package in the "Package Registry" of the secure element.
3. Upon reception of the Security Domain component:
   a. Use the CA Identifier to look up for a suitable set of credentials. If the CA Identifier is not present, use a default set of credentials (if any). If none is available then abort the loading procedure.
   b. If the Key Protection Block is not present then abort the loading procedure.
   c. Create the new SD with the specified AID, installation parameters and meta-data.
   d. Recover KS.KEY.ENC from the Key Protection Block.
      i. If EC cryptography is used then the Key Protection Block consists of ephemeral public key ePK and the secure element shall perform a key agreement combining ePK with SK.CA.ECKA to compute KS.KEY.ENC.
      ii. If RSA cryptography is used then the Key Protection Block consists of the encrypted KS.KEY.ENC and the secure element shall decrypt this block using SK.CA.ENC to recover KS.KEY.ENC.
   e. Generate a Random Secret (RS).
   f. Derive cryptographic keys from RS for the newly created SD.
   g. The Security Domain is now correctly initialized and the package shall be associated to this Security Domain.
4. Prepare the response to the AP:
   a. Encrypt RS using KS.KEY.ENC.
   b. Sign the encrypted RS block using SK.CA.AUT.
5. Build and send the response to the AP:
   a. Include the encrypted and signed RS block
   b. [Optional] Include CERT.CA.AUT if it is not otherwise expected that AP may have retrieved this certificate off-secure element from the CA.
   c. [Optional] Include CERT.CA.ECKA if EC cryptography was used and it is not otherwise expected that AP may have retrieved this certificate off-secure element from the CA.

Upon reception of the response, the AP shall:
1. Verify the encrypted and signed RS block using PK.CA.AUT previously extracted from CET.CA.AUT.
2. Recover KS.KEY.ENC
   a. If EC cryptography is used then the AP shall perform a key agreement combining eSK (corresponding to previously generated ePK) with PK.CA.ECKA (previously extracted from CERT.CA.ECKA) to compute KS.KEY.ENC.
   b. If RSA cryptography is used then the AP already knows KS.KEY.ENC (and had previously included it (encrypted) in the Security Domain component).
3. Decrypt the encrypted RS block using KS.KEY.ENC.
4. Derive cryptographic keys from RS using the same algorithm that was used on-secure element to derive cryptographic keys for the newly created Security Domain.
5. The AP now has the required cryptographic keys to establish a secure connection with its Security Domain and may conduct further operations.

Figure 10:
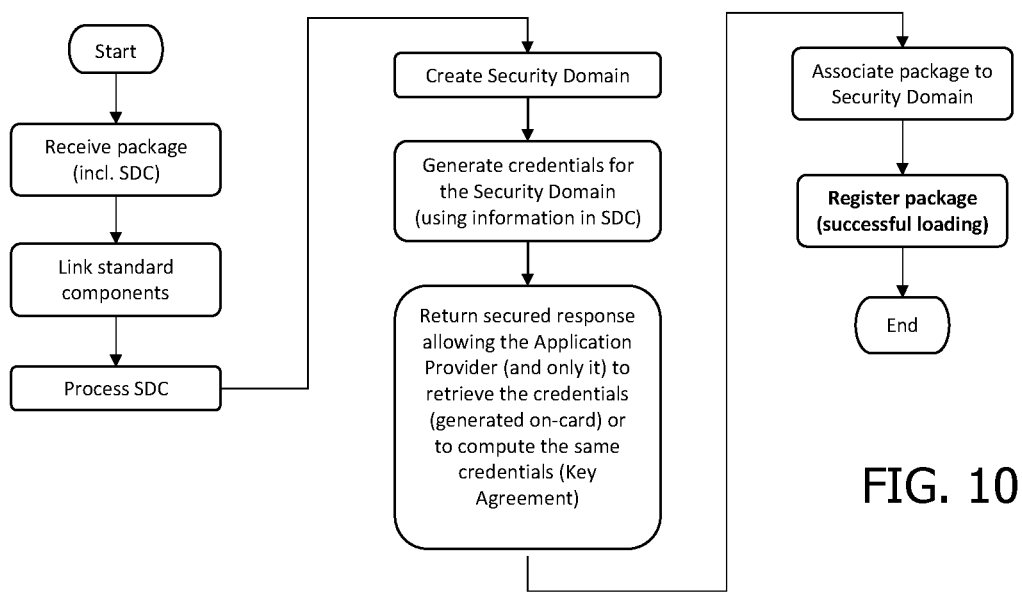
FIG. 10 shows an example of flow diagram of processing a package including a Security Domain component.

FIG. 10 shows an example of flow diagram of processing a package including a Security Domain component SDC.

An aspect of the invention allows an Application Provider to easily and securely set up a Security Domain, load a Java Card package and associate this package to its Security Domain.

Figure 5:
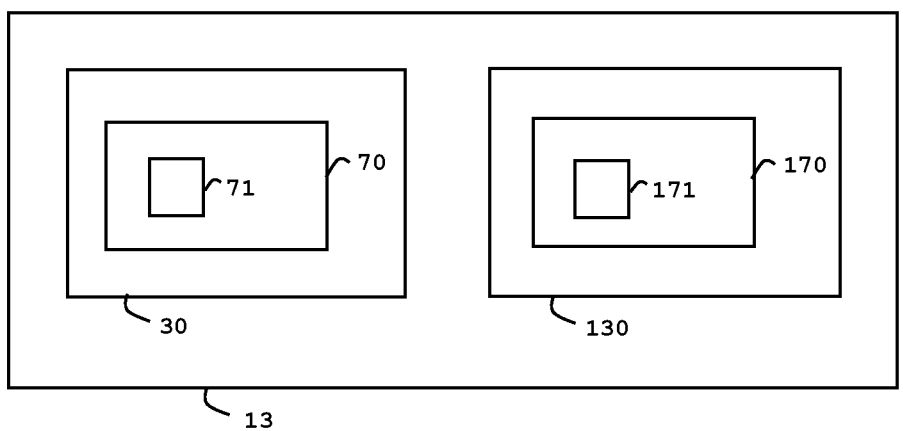

FIG. 5 shows schematically the configuration of a storage area 13 of a secure element according to an example of the invention.

In this embodiment, the storage area 13 stores a load file 30 associated to a first package and a load file 130 associated to a second package. The load file 30 includes a Group component (GRC) 70 containing a group parameter 71 which defines a group of packages sharing at least one security attribute. The load file 130 includes a Group component (GRC) 170 containing a group parameter 171 which defines a group of packages sharing at least one security attribute. The Group components are custom components within the meaning of Java Card™ specifications. Both first and second packages belong to said group of packages.

An Application Provider (AP) loading a Java Card package to a secure element may at the same time create a new Package Group for this package or associate this package to an existing Package Group on the secure element. Belonging to a Package Group implies that the sharing of a number of functional or security attributes. The AP may therefore load several packages, associate them to the same Package Group and have them sharing a number of attributes. The list of attributes that are shared is either implicitly known or specified as a multiple choice among a list of attributes supported by the secure element implementation (NB: well-known attributes or proprietary attributes).

According to an aspect of the invention, a primary example of attribute that may be shared by packages associated to the same Package Group is the Firewall Context ID which, if shared by multiple packages, allows Applet instances created from such packages to communicate and access each other as freely as if they were belonging to the same package.

In order to create a new Package Group on a secure element, the AP may only need to use an AP Public Key for Signature Verification (PK.AP.AUT) and corresponding AP Private Key for Signature Generation, or it may in addition need to obtain from the Card Issuer or from a Controlling Authority (CA) an AP Public Key Certificate (CERT.AP.AUT) certifying its PK.AP.AUT. In fact, more than one CA may be able to deliver such a certificate.

To simplify the descriptions below, we will simply use the term CA when referring to either the Card Issuer or one of the CAs.

The need to involve a CA in the deployment of the described mechanism essentially depends on the security conditions under which packages will be loaded to the secure element, e.g. whether secure element administrators can be trusted or not, whether secure messaging will be used, whether the package contains its own security, etc.

In a variant of the invention, the secure element on which the packages are loaded may need to be prepared in the following way:

The secure element shall contain one or several sets of credentials whose purpose is to verify and unwrap the security of the protected package. Typically, the Card Issuer may set up such a set of credentials, but also one or several Controlling Authorities (CA) may have their sets of credentials stored on the secure element.

Each set of credentials shall be associated with a CA identifier that may later be used to find it.

Each set of credentials shall be composed of:
  CA Public Key for Signature Verification (PK.CA.AUT)

A Package Group shall be identified using a Group ID. A suitable Group ID would be the AID of the package being loaded when the new Package Group is created.

The Group component shall contain information related to:
  [Optional] CA Identifier allowing to look for and retrieve a suitable set of credentials within the secure element. If none is specified, the secure element may try to use a default set of credentials (if any is present on the secure element).
  [Conditional] AP Public Key for Signature Verification (PK.AP.AUT) or AP Public Key Certificate (CERT.AP.AUT) certifying PK.AP.AUT, if a request to create a new Package Group is made.
  [Optional] Group ID of the Package Group that shall be created and/or to which this package shall be associated. If not present, a default ID may apply e.g. package AID.
  [Mandatory] Random Challenge.
  [Optional] List of Shared Attributes, if a request to create a new Package Group is made. If not present, a default choice may apply.
  [Mandatory] Signature of the Random Challenge and List of Shared Attributes (if present), generated using the AP Private Key for Signature Generation (SK.AP.AUT).

Here is an example of runtime behavior upon package loading:
1) Reception of package binary data
2) Upon reception of the last mandatory standard component (as defined by Java Card Specifications), proceed with the linking of the executable code and register the package in the "Package Registry" of the secure element.
3) Upon reception of the Group component:
    d. If a CA Identifier is present, look for the specified set of credentials. If it cannot be found, then abort the procedure. If the CA Identifier is not present, use a default set of credentials (if any).
    e. If PK.AP.AUT is present and the secure element implementation expected CERT.AP.AUT instead, then abort the procedure.
    f. If CERT.AP.AUT is present and no set of credentials was specified or found, abort the procedure. Otherwise, verify CERT.AP.AUT with PK.CA.AUT and extract PK.AP.AUT. If the verification fails, abort the procedure.
    g. If the package is being associated to a new Group ID (i.e. PK.AP.AUT or CERT.AP.AUT was present):
       i. If the specified Group ID (or the one chosen by default) is already registered on the secure element, then abort the procedure.
       ii. Verify the Signature of the Random Challenge and List of Shared Attributes (if present) using PK.AP.AUT. If the verification fails, then abort the procedure.
       iii. Register the new Group ID together with PK.AP.AUT and the List of Shared Attributes (if present).
       iv. Associate the package with the new Group ID.
    h. If the package is being associated to an existing Group ID (i.e. neither PK.AP.AUT nor CERT.AP.AUT was present):
       i. If the specified Group ID (or the one chosen by default) is not registered on the secure element, then abort the procedure.
       ii. Verify the Signature of the Random Challenge using the PK.AP.AUT associated with the specified Group ID. If the verification fails, then abort the procedure.
       iii. Associate the package with the specified Group ID.

Packages associated with the same Group ID may now benefit from sharing the same attributes.

Figure 11:
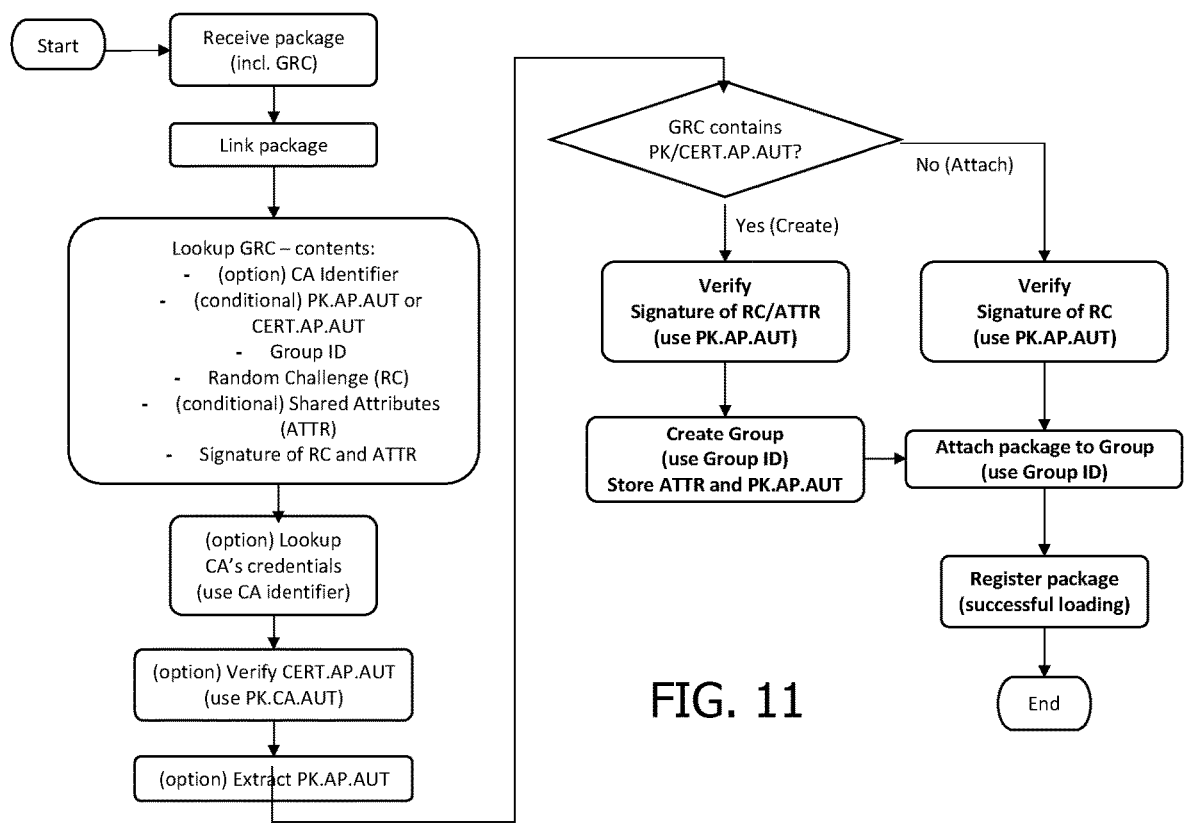
FIG. 11 shows an example of flow diagram of processing a package including a Group component GRC.

FIG. 11 shows an example of flow diagram of processing a package including a Group component GRC.

The above-presented aspect of the invention allows an Application Provider to develop applications easier to maintain (i.e. better design) and showing better performances, with lower code size and lower resource consumption.

Thanks to this aspect of the invention, there is no need for additional cryptographic mechanisms for different packages to trust each other. Trust can be established right from the start during the loading by attaching packages to the same group.

FIG. 6 shows schematically the configuration of a storage area 13 of a secure element according to an example of the invention.

In this embodiment, the storage area 13 stores a load file 30 including a Security component 80 (SEC) containing at least a security parameter 81 which is required to verify the genuineness of the package or to decipher part of the load file 30. The Security component 80 is a custom component within the meaning of Java Card™ specifications.

Using an aspect of the invention, an Application Provider (AP) may secure its Java Card package, or have it secured by some trusted third party, so as to deploy it to a "group of secure elements" (i.e. to any secure element of such a group).

Each secure element of that "group of secure elements" shall be prepared in the following way:
The secure element shall contain one or several sets of credentials whose purpose is to verify and unwrap the security of the protected package. Typically, the Card Issuer may set up such a set of credentials, but also one or several Controlling Authorities (CA) may have their sets of credentials stored on the secure element.
To simplify the descriptions below, we will simply use the term CA when referring to either the Card Issuer or one of the CAs.
Each set of credentials shall be associated with a CA Identifier that may later be used to find it.
Each set of credentials shall be composed of:
CA Public Key for Signature Verification (PK.CA.AUT)
CA Private Key for Decryption or Key Agreement (SK.CA.ENC)
Would be used for Decryption if SK.CA.ENC is an RSA Private Key.
Would be used for Key Agreement if SK.CA.ENC is an ECC Private Key.

In a typical usage of this embodiment, a CA would deploy the same set of credentials on all the secure elements of a fleet of secure elements. Then the AP may request the CA to protect its package (using CA's credentials) so that it may be deployed to this entire fleet of secure elements.

The Security component (SEC) shall be the last component of the package.

In a variant of the invention, when the secure element receives the load file (i.e. CAP file) and a Security component is present, the secure element shall assume that the contents (values) of each CAP file component, except the contents of the Security component, are encrypted with a symmetric encryption/decryption key KS.CAP.ENC:
If SK.CA.ENC is an ECC Private Key, then the entity protecting the CAP file shall generate an ephemeral EC key pair (ePK, eSK), and perform a key agreement combining eSK with PK.CA.ENC to compute KS.CAP.ENC. In this case, ePK will be included in the Security component.
If SK.CA.ENC is an RSA Private Key, then the entity protecting the CAP file can simply generate a random KS.CAP.ENC. In this case, KS.CAP.ENC will be encrypted using PK.CA.ENC and the encrypted KS.CAP.ENC will be included in the Security component.

In another variant of the invention, only a selection of the CAP file components may be encrypted. The list of non-encrypted components may either be known implicitly, or a list may be provided in the Security component. Typically, it may be useful that some less sensitive components (i.e. regarding confidentiality) can be analyzed immediately as they are received instead of waiting for the entire CAP file to be received.

In a further variant of the invention, encrypting the CAP file components is fully optional. Indeed, encrypting the CAP file may sometimes not be needed depending on the business or deployment context. In addition to potentially simplifying the security scheme and process, a CAP file containing a Security component but for which CAP file components wouldn't be encrypted could be loaded on any secure element, including secure elements that do not support this security scheme. Indeed, the Java Card Specifications specify that a Custom component shall simply be ignored/skipped if not supported by the secure element implementation.

According to an embodiment, the Security component shall contain (at least):
[Optional] CA Identifier allowing to look for and retrieve a suitable set of credentials within the secure element. If none is specified, the secure element may try to use a default set of credentials.
[Mandatory] Key Protection Block which will allow recovering the symmetric encryption/decryption key KS.CAP.ENC that shall be used to decrypt the CAP file components.
If SK.CA.ENC is an ECC Private Key, then the Key Protection Block consists of the ephemeral public key ePK as previously explained.
If SK.CA.ENC is an RSA Private Key, then the Key Protection Block consists of the encrypted KS.CAP.ENC as previously explained.
[Mandatory] Signature of the CAP file. This signature shall be the last piece of data appearing in the Security component and can be computed over the following data:
Concatenation of the encrypted contents of all previously received CAP file components;
Contents of the Security component without the signature (which has not been generated yet).
In a variant of the invention, the signature is not computed directly over above mentioned data but over a hash (i.e. cryptographic digest) of these data.
Example of runtime behavior upon package loading:
1) Receive and store the protected package.
2) Look for the Security component (i.e. if present, should be the last component).
3) Use the CA Identifier to look up for a suitable set of credentials. If the CA Identifier is not present, use a default set of credentials (if any). If none is available then abort the loading procedure.
4) Verify the signature of the CAP file using the PK.CA.AUT. If the verification fails then abort the loading procedure.
5) If the Key Protection Block is not present then abort the loading procedure.
6) Recover KS.CAP.ENC from the Key Protection Block.
 a. If the identified SK.CA.ENC is an ECC Private Key, the Key Protection Block consists of ephemeral public key ePK and the secure element shall perform a key agreement combining ePK with SK.CA.ENC to compute KS.CAP.ENC.

b. If the identified SK.CA.ENC is an RSA Private Key, the Key Protection Block consists of the encrypted KS.CAP.ENC and the secure element shall decrypt this block using SK.CA.ENC to recover KS.CAP.ENC.

7) Use KS.CAP.ENC to decrypt all the CAP file components.

8) The CAP file has been verified and decrypted and can now be linked by the secure element. Upon successful link, the secure element can finalize the registration of the package and record the successful loading of the package.

9) A cryptogram can be computed and sent to the server which provided the package in order to prove correct treatment of the Security component.

In a variant of the invention, the CA (i.e. Card Issuer or Controlling Authority) is responsible for protecting the CAP file upon request from the Application Provider.

In another variant of the invention, the CA would provide the AP with a certificate CERT.AP.AUT certifying an AP Public Key for Signature Verification (PK.AP.AUT) (i.e. a key generated and owned by the AP). In this case, the AP would be able to and directly responsible for protecting the CAP file, without further help from the CA (i.e. the CA delivers CERT.AP.AUT once for all):

With the corresponding AP Private Key for Signature Generation (SK.AP.AUT), the AP is able to sign the CAP file. In this scenario, SK.CA.AUT was used to sign/generate the AP certificate CERT.AP.AUT.

The Security component also includes CERT.AP.AUT.

PK.CA.AUT (on-secure element) is used to verify CERT.AP.AUT and extract PK.AP.AUT from this certificate.

PK.AP.AUT is used to verify the signature of the CAP file.

It is assumed that PK.CA.ENC is either publicly available (under the form of a certificate CERT.CA.ENC from which PK.CA.ENC may be extracted) or somehow provided by the CA to the AP. Then the AP is able to compute the suitable KS.CAP.ENC using PK.CA.ENC, and the AP is able to encrypt the CAP file components as needed.

Figure 12:
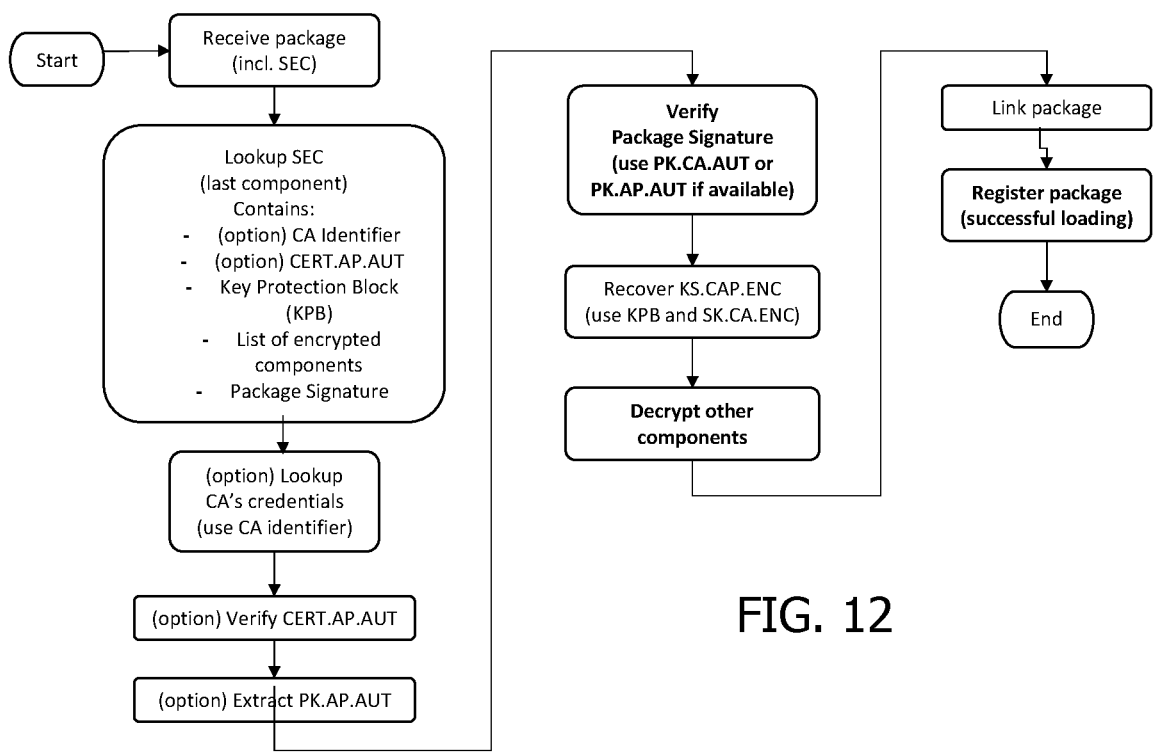
FIG. 12 shows an example of flow diagram of processing a package including a Security component SEC.

FIG. 12 shows an example of flow diagram of processing a package including a Security component SEC.

The above-presented aspect of the invention allows an Application Provider to secure the deployment of a Java Card package, with precomputed signature and encryption. Such protection does not depend on the establishment of a one-to-one secured connection with the secure element.

The above-presented aspect of the invention allows several Controlling Authorities and delegation of the package protection operation to the Application Provider (through deliverance of CERT.AP.AUT).

Another aspect of the invention is a method for generating a load file 30 containing a binary representation of a package of a class to be loaded on a secure element. The method comprises the steps of:

generating an executable data to be directly invoked through an Application Programming Interface (API) by an instance of a class instantiated from the package and stored in the storage area, generating a specific component containing the executable data, the specific component being a custom component within the meaning of Java Card™ specifications, and including the specific component in the load file.

Advantageously, the method may also comprise a step of generating any one of the Setup component, Security Domain component, Group component and Security component as described above and to include it in the load file.

Another aspect of the invention a secure element intended to be embedded in a hosting machine. The secure element comprises a virtual machine, a loader and a linker. The secure element is able to receive a load file containing a binary representation of a package of a class and to create an instance of the class from this package. The loader is adapted to retrieve from the load file and to handle a specific component which is a custom component within the meaning of Java Card™ specifications and which comprises executable data to be directly invoked through an Application Programming Interface (API) by the instance of the class. The linker is adapted to perform a linking phase of the executable data contained in the specific component.

The loader may be configured to personalize the instance by automatically running a subset of executable data.

The loader may be configured to automatically detect the presence of Setup component in the load file and to automatically install the instance according to one or several installation parameters included in the Setup component. The loader may also be configured to automatically run a subset of executable data present in the Perso component to personalize the instance that has been installed.

The loader may be configured to automatically detect the presence of Security Domain component in the load file and to securely initialize a Security Domain to which the package is associated thanks to Security Domain parameters included in the Security Domain component.

The loader may be configured to automatically detect the presence of Security component in the load file and to verify the genuineness (i.e. origin/integrity) of the package according to one or several security parameters included in the Security component and/or to decipher part of the load file using one or several security parameters included in the Security component.

Advantageously, the loader can be configured to send back, to the Application provider server, data generated during the personalization phase.

The invention is not limited to the described embodiments or examples. In particular, the secure element may comprises a plurality of packages for which several instances of class are installed. The above described specific component, Setup component, Security Domain component, Group component and Security component may be merged in any combination of custom components. A load file may include several copies of each of these custom components.

The invention claimed is:

1. A method for managing an instance of a class in a secure element embedded in a hosting machine, said secure element including a central processing unit, a storage area and a virtual machine, the method comprising a step of receiving by the secure element a load file containing a binary representation of a package of the class and a step of instantiating the instance from said package and storing the instance in the storage area, said load file including a specific component, which is a custom component within the meaning of Java Card specifications, and which contains executable data separate from said instance, wherein said executable data are executable in a same format as bytecode, and the instance, after said instantiating and storing, the method includes initiating an execution of a subset of said executable data by directly invoking said subset of executable data through an Application Programming Interface (API) under control of said instance to trigger execution of said executable data during runtime of said instance, which is designed to personalize said instance.

2. The method according to claim 1, wherein the specific component contains pre-linked heap data in addition to executable data, and wherein said pre-linked heap data are copied from storage area to a heap of the virtual machine to personalize said instance,
wherein said pre-linked heap data is executable bytecode by said instance adapted by said secure element to compute a final location in said heap and correctly associate with said instance.

3. The method according to claim 1, wherein the load file includes a Setup component containing an installation parameter which triggers an automatic installation of said instance, said Setup component being a custom component within the meaning of Java Card specifications.

4. The method according to claim 3, wherein the installation parameter triggers at least one of the following actions: an automatic installation of the instance, an automatic association of the instance to a security domain and an automatic creation of a security domain.

5. The method according to claim 1, wherein the load file includes a Security Domain component containing Security Domain parameters which are required to securely initialize a Security Domain to which the package is associated, said Security Domain component being a custom component within the meaning of Java Card specifications.

6. The method according to claim 1, wherein the load file includes a Group component containing a group parameter which defines a group of packages sharing at least one security attribute, said package belonging to said group of packages and said Group component being a custom component within the meaning of Java Card specifications.

7. The method according to claim 6, wherein said at least one security attribute is a Firewall Context ID.

8. The method according to claim 1, wherein the load file includes a Security component containing a security parameter which is required to verify the genuineness of the package or to decipher part of the load file, said Security component being a custom component within the meaning of Java Card specifications.

9. A secure element embedded in a hosting machine and including an operating system, a central processing unit, a storage area, a virtual machine, a loader and a linker, said secure element being configured to receive a load file containing a binary representation of a package of a class and to create an instance of the class from said package, said loader being configured to retrieve from the load file and to handle a specific component which is a custom component within the meaning of Java Card specifications,
wherein said specific component comprises executable data which are executable in a same format as bytecode designed to personalize said instance and wherein after said instantiating and storing, the instance is configured to initiate the execution of a subset of said executable data by directly invoking said subset of executable data through an Application Programming Interface (API) under control of said instance to trigger execution of said executable data during runtime of said instance.

10. The secure element according to claim 9, wherein the load file includes a Setup component containing an installation parameter which triggers an automatic installation of said instance by the loader, said Setup component being a custom component within the meaning of Java Card specifications.

11. The secure element according to claim 9, wherein the load file includes a Security Domain component containing Security Domain parameters which are used by the loader to securely initialize a Security Domain to which the package is associated, said Security Domain component being a custom component within the meaning of Java Card specifications.

12. The secure element according to claim 9, wherein the load file includes a Security component containing a security parameter which is used by the loader to verify the genuineness of the package or to decipher part of the load file, said Security component being a custom component within the meaning of Java Card specifications.

* * * * *